United States Patent [19]

Dalziel

[11] Patent Number: 4,724,500
[45] Date of Patent: Feb. 9, 1988

[54] MECHANISM FOR PREVENTING SHOCK DAMAGE TO HEAD SLIDER ASSEMBLIES AND DISKS IN RIGID DISK DRIVE

[75] Inventor: Warren L. Dalziel, Monte Sereno, Calif.

[73] Assignee: Tandon Corporation, Chatsworth, Calif.

[21] Appl. No.: 896,762

[22] Filed: Aug. 14, 1986

[51] Int. Cl.⁴ .................................................. G11B 5/58
[52] U.S. Cl. ..................................... 360/103; 360/104
[58] Field of Search ................ 360/104, 105, 106, 103

[56] References Cited

U.S. PATENT DOCUMENTS

| 4,089,029 | 5/1978 | Castrodale | 360/99 |
| 4,206,489 | 6/1980 | Manzke | 360/105 |
| 4,306,260 | 12/1981 | Maeda | 360/105 |
| 4,328,521 | 5/1982 | Pexton | 360/105 X |

FOREIGN PATENT DOCUMENTS

| 33809 | 8/1881 | European Pat. Off. | 360/104 |
| 58-105463 | 6/1983 | Japan | 360/104 |

*Primary Examiner*—S. J. Heinz
*Attorney, Agent, or Firm*—Bogucki, Scherlacher Mok & Roth

[57] ABSTRACT

In a magnetic disk drive in which a cantilevered arm for mounting a magnetic head slider assembly is pivoted to move the slider assembly between a loaded position adjacent a rigid magnetic disk and an unloaded position spaced apart from the disk, a mechanism is provided for limiting the extent of movement of the slider assembly relative to the arm to prevent damaging contact of the slider assembly with the disk when the arm is in the unloaded position and the disk drive is subjected to shock loads. The slider assembly is mounted in gimballed fashion at a free outer end of the arm by a flexure element having different portions secured to the arm and to the slider assembly and a gimballing protuberance engaging the arm. The mechanism for limiting movement of the slider assembly relative to the arm includes a pair of wing elements mounted on an opposite pair of raised shoulders of the slider assembly and an elongated support element mounted on the arm and terminating in an end portion disposed between the opposite wing elements and a central portion of the slider assembly to limit downward motion of the slider assembly away from the arm as well as rotational motion of the slider assembly relative to the arm. In alternative arrangements the mechanism for limiting movement comprises a single limit element mounted either on or between the opposite pair of raised shoulders and operative to engage the arm to limit movement of the slider assembly.

17 Claims, 16 Drawing Figures

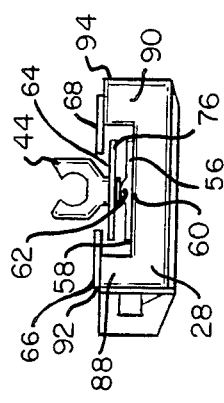
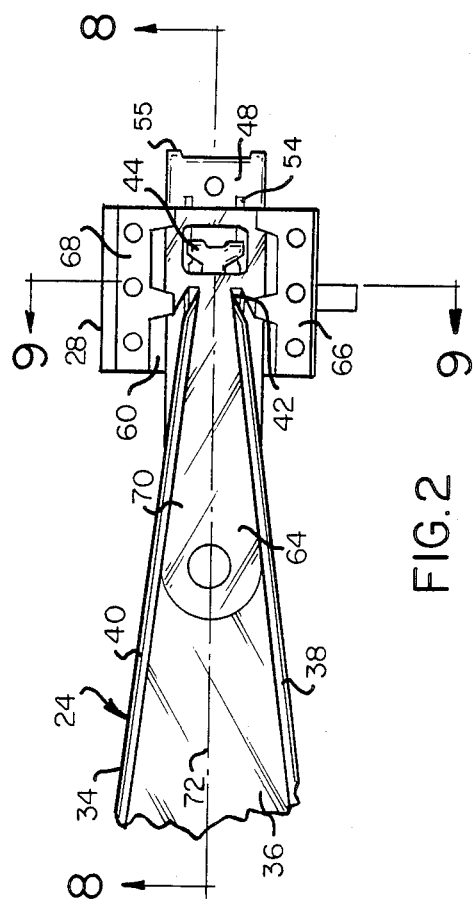
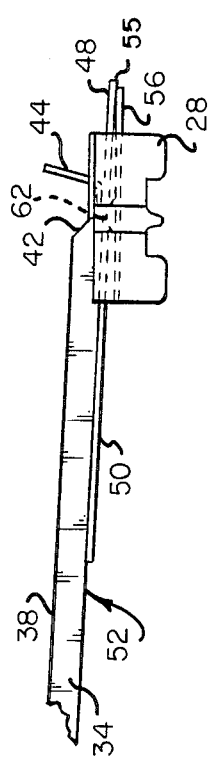

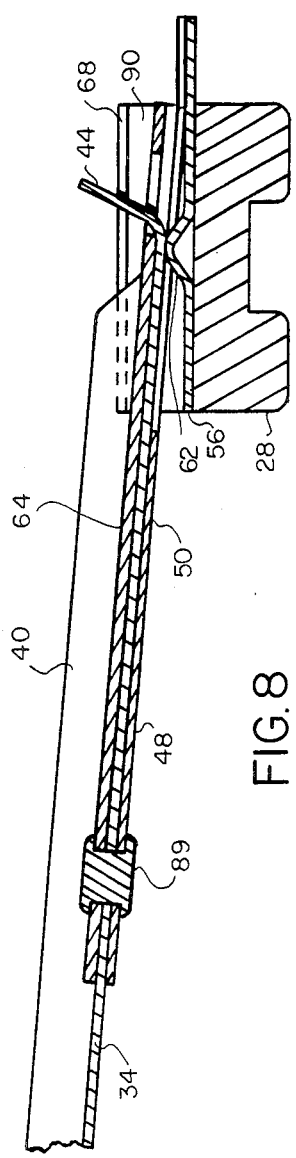
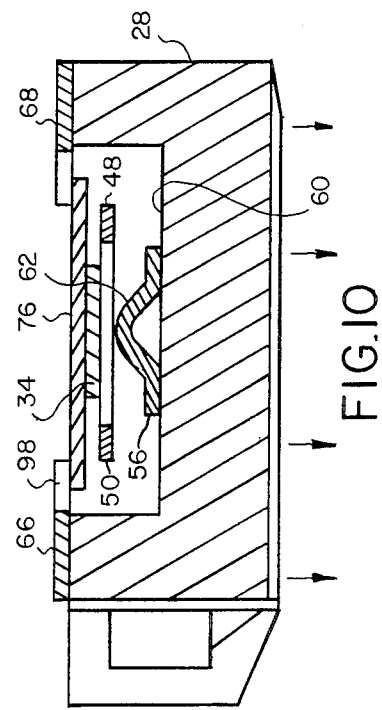
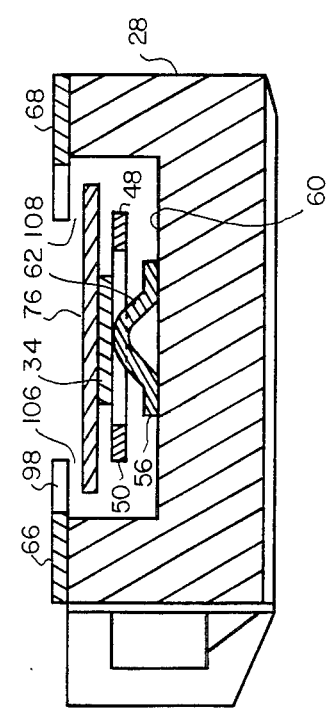

MECHANISM FOR PREVENTING SHOCK DAMAGE TO HEAD SLIDER ASSEMBLIES AND DISKS IN RIGID DISK DRIVE

BACKGROUND OF THE INVENTION

1. Field of the Invention

The present invention relates to magnetic disk drives, and more particularly to a mechanism for preventing damaging contact between a magnetic head slider assembly and a rigid magnetic disk due to shock loads applied to a magnetic disk drive.

2. History of the Prior Art

Among the better known data storage devices are magnetic disk drives of the type in which a magnetic head slider assembly floats on an air bearing at the surface of a rotating rigid magnetic disk. Such disk drive are often of the so-called Winchester type in which one or more rigid magnetic disks are located within a sealed chamber together with one or more magnetic head slider assemblies. The magnetic disk drive may include one, two or more rigid magnetic disks, and the slider assemblies may be positioned at one or both of the opposite sides of each of the magnetic disks.

Each magnetic head slider assembly in magnetic disk drives of the type referred to is typically coupled to the free outer end of a different one of a plurality of elongated arms or load beams. The slider assembly is mounted in a manner to permit gimballed movement at a free outer end of the arm so that an air bearing between the slider assembly and the surface of the rigid magnetic disk can be established and maintained. The elongated arm is coupled to an appropriate mechanism for moving the arm across the surface of the disk so that a magnetic head contained within the slider assembly can address different ones of concentric data tracks on the disk for writing information into or reading information from the data tracks.

An example of an arm assembly having a gimballed mount for a magnetic head slider assembly is provided by U.S. Pat. No. 3,931,641 of Watrous. The arm assembly described in the Watrous patent includes a relatively rigid load beam having a rigid bearing member at a free outer end thereof for receiving a protuberance on a spring element. The spring element is spot welded to the load beam and has an end thereof defining a flexure. The flexure includes a pair of stiff crosslegs mounted on an opposite pair of flexible outer fingers and a central finger. The central finger mounts a magnetic head slider assembly, and gimballed movement is provided by the load protuberance on the spring element which is held in contact with the bearing member at the end of the rigid load beam. Such arrangement provides desired gimballing action by allowing a pitch and roll of the slider assembly around mutually orthogonal axes while at the same time resisting radial, circumferential and yaw motions.

In magnetic disk drives of the type described, physical contact of the surface of the magnetic disk containing the data tracks by the slider assembly must be avoided. Consequently arrangements must be provided for preventing such contact when the magnetic disk is at rest or is otherwise not rotating at its nominal operating speed. When the disk is rotating at its nominal operating speed, the air bearing between the slider assembly and the disk is usually sufficient to prevent contact therebetween. One technique commonly employed is to move the slider assembly onto a portion of the disk where physical contact can be tolerated whenever the disk is decelerated to rest. One or more so-called parking zones are provided on the surface of the disk where the slider assembly may rest. When the disk is accelerated to its nominal operating speed, the air bearing again forms and the slider assembly may then be moved to the data tracks. Another common technique for preventing contact between the slider assembly and the disk surface when the disk is decelerated to rest is to pivot the arm so as to move the slider assembly away from the surface of the disk. This moves the slider assembly into an unloaded position well away from the disk surface. When the disk is again accelerated to the nominal operating speed, the arm is pivoted so as to bring the slider assembly back into a loaded position in which the air bearing forms between the slider assembly and the surface of the disk.

An example of an arrangement for raising and lowering the arm so as to move the slider assembly between loaded and unloaded positions is provided by a copending application of Warrent L. Dalziel, Ser. No. 759,900, filed July 29, 1985 and commonly assigned with the present application. The Dalziel application describes a mechanism for loading and unloading one or more slider assemblies using simple mechanical apparatus. Such apparatus engages the arms to raise them into unloaded positions and at the same time limit their radial movement. A separator element is movable between first and second positions to selectively engage the arms. When the separator element is in a first position, the slider assemblies are in loaded positions, and radial motion of the slider assemblies is not inhibited. Movement of the separator element into a second position moves the slider assemblies into unloaded positions and at the same time locks an associated carriage assembly in a selected position to inhibit radial motion of the slider assemblies.

Each time the disks are decelerated to rest in the arrangement described in Dalziel application Ser. No. 759,900, the slider assemblies are raised into the unloaded positions and at the same time radial movement of the arms is limited. This does much to protect the sensitive components of the magnetic disk drive against damage due to shock loads such as may occur if the disk drive is dropped or otherwise bumped. Nevertheless, depending upon the manner of coupling the slider assemblies to the ends of the elongated arms, it may be difficult or impossible to prevent damaging contact between the slider assemblies and the disk surfaces. This is so even though the arms are pivoted to move the slider assemblies into unloaded positions well away from the disk surfaces. Inadvertent dropping of the magnetic disk driven onto a hard surface or other application of severe shock loads may still result in the slider assemblies contacting the disk surfaces with possible damage to the slider assemblies or the disk surfaces or both. Typically the slider assembly is coupled to the free outer end of the arm by a flexure element which is highly flexible and which therefore permits substantial movement of the slider assembly away from the arm in response to shock loads and other substantial forces.

Accordingly, it is an object of the invention to provide an improved magnetic disk drive, and particularly an improved disk drive of the type in which one or more magnetic head slider assemblies are employed in conjunction with one or more rigid magnetic disks.

It is a further and more specific object of the invention to provide an improved magnetic disk drive in which the possibility of damaging contact of the disk surfaces by the slider assemblies in response to shock loads when the arm is raised into an unloaded position is greatly minimized or eliminated.

BRIEF DESCRIPTION OF THE INVENTION

The present invention provides an improved magnetic disk drive which includes a mechanism for preventing shock damage to the slider assemblies and to the rigid disks of the disk drive. Such mechanism, which does not in an way interfere with the normal gimballed movement of the slider assembly when the slider assembly is in the loaded position, comes into play to limit the movement of the slider assembly relative to the supporting free outer end of an elongated supporting arm when the arm is raised into the unloaded position. During periods of non-use of the disk drive when the slider assemblies are suspended in unloaded positions, the magnetic disk drive may be subjected to substantial shock loads. This may occur by accidental dropping of the disk drive during transport thereof or due to other shocks. Even though the slider assemblies are spaced well apart from the adjacent surfaces of the magnetic disks when in the unloaded positions, dropping of the magnetic disk drive might otherwise result in damaging contact of the disk surfaces by the slider assemblies as such assemblies undergo substantial downward movement relative to the supporting arms in response to the shock loads. The mechanism in accordance with the invention limits the downward movement of the slider assemblies relative to the supporting arms to prevent such damaging contact.

A preferred arrangement of a mechanism in accordance with the invention for limiting the motion of a slider assembly relative to its supporting arm is employed in conjunction with an arm comprised of an elongated load beam of relatively rigid construction. A relatively flexible and resilient flexure element has a first portion thereof secured to the underside of the load beam adjacent a free outer end of the load beam and an adjacent second portion joined to the first portion through a bend in the flexure element. The second portion of the flexure element is secured to the top of a central portion of a slider assembly containing a magnetic head. A gimballing protuberance in the second portion extends in a direction away from the slider assembly and toward the load beam. With the load beam lowered to a loaded position, the slider assembly undergoes the desired gimballing motion about the protuberance which engages the underside of the load beam.

The mechanism for limiting movement of the slider assembly relative to the load beam includes an elongated support element mounted on and extending along the load beam adjacent the free outer end of the load beam and terminating in an end portion extending beyond the free outer end. The end portion of the elongated support element has an opposite, spaced-apart, generally parallel pair of transverse members extending between the opposite ends of an opposite, spaced-apart, generally parallel pair of side arms. An aperture is defined in the end portion between the opposite transverse members and the opposite side arms. A pair of wing elements are mounted on an opposite pair of raised shoulders of the slider assembly on opposite sides of the central portion of the slider assembly. Each of the wing elements has an elongated body portion extending along one of the raised shoulders and a pair of tabs extending transversely from the elongated body portion at two different locations along the length of the body portion. The wing elements are disposed on an opposite side of the end portion of the elongated support element from the central portion of the slider assembly such that the tabs of each wing element are disposed above and adjacent the opposite ends of a different one of the opposite pair of side arms.

If the disk drive is subjected to a sudden downward shock load such as from dropping the disk drive, the wing elements engage the support element to thereby limit the downward movement of the slider assembly which results from the highly flexible nature of the flexure element. After occurrence of the small amount of downward movement of the slider assembly relative to the free outer end of the load beam as defined by the distance between the wing elements and the support element, the tabs of the opposite wing element engage the opposite side arms of the support element to prevent further movement of the slider assembly relative to the free outer end of the load beam. When the slider assembly is placed in the operative position by the load beam so as to create an air bearing with the adjacent magnetic disk surface, the tabs of the opposite wing elements remain above and well out of contact with the opposite pair of side arms of the support element so as not to interfere with the normal gimballing movement of the slider assembly.

In a first alternative embodiment of a mechanism in accordance with the invention for limiting the motion of a slider assembly relative to its supporting arms, a single, integrally formed limit element is employed instead of the elongated support element and the separate wing elements. The single limit element is mounted on the opposite raised shoulders of the slider assembly and has a central portion thereof bridging the space between the opposite raised shoulders just above the free outer end of the load beam. Sudden downward shock loads cause the central portion of the limit element to drop onto the free outer end of the load beam and thereby limit the downward movement of the slider assembly.

In a second alternative embodiment of a mechanism in accordance with the invention for limiting the motion of a slider assembly relative to its supporting arm, a single limit element is dimensioned so as to bridge the gap between the inner walls of the opposite raised shoulders of the slider assembly. The limit element is secured to the inner walls so as to reside a selected distance above the free outer end of the load beam. In this manner the limit element does not interfere with the normal gimballing movement of the slider assembly. Sudden downward shock loads cause the limit element to drop onto the free outer end of the load beam and thereby limit the downward movement of the slider assembly.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIG. 2 is a top view of a portion of one of the arm assemblies of the disk drive of FIG. 1 including a preferred embodiment of a mechanism for limiting movement of the slider assembly;

FIG. 3 is a side view of the apparatus shown in FIG. 2;

FIG. 4 is a front view of the apparatus shown in FIG. 2;

FIG. 8 is a sectional view of the arm assembly of FIGS. 2-4 taken along the line 8—8 of FIG. 2;

FIG. 9 is a sectional view of the arm assembly of FIGS. 2-4 taken along the line 9—9 of FIG. 2;

FIG. 10 is a sectional view similar to that of FIG. 9 but with a sudden downward shock load applied;

DETAILED DESCRIPTION OF THE INVENTION

Figure 1:
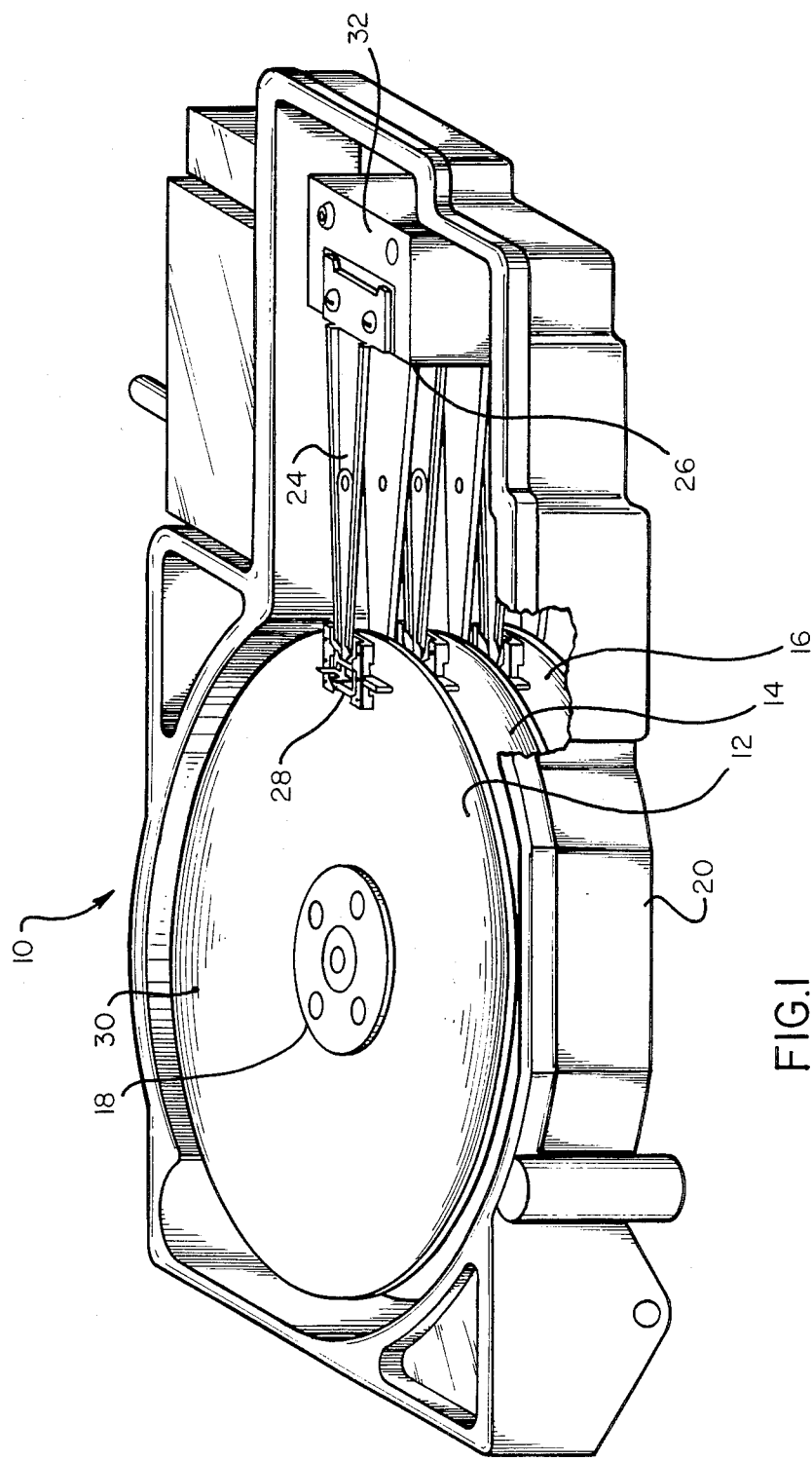
FIG. 1 is a perspective view of a rigid disk drive employing mechanisms in accordance with the invention for limiting movement of the slider assemblies relative to the supporting arm assemblies in response to shock loads to the disk drive.

FIG. 1 depicts a magnetic disk drive 10 having three different rigid disks 12, 14 and 16 mounted in parallel, spaced-apart relation for rotation about a common spindle assembly 18. The rigid disks 12, 14 and 16 and the spindle assembly 18 are mounted on a base member 20 for the disk drive 10.

Each of the magnetic disks 12, 14 and 16 of the disk drive 10 is associated with a different pair of arms for disposing magnetic head slider assemblies at opposite sides of the disk. For example, the magnetic disk 12 has a pair of arms 24 and 26 disposed on opposite sides thereof. The arm 24 mounts at an outer free end thereof a magnetic head slider assembly 28 adjacent a top surface 30 of the disk 12. Hidden from view in FIG. 1 is a second slider assembly disposed adjacent a bottom surface of the disk 12 by the arm 26. In like fashion the disks 14 and 16 each have a pair of slider assemblies disposed at the opposite surfaces thereof by a different pair of arms.

The various arms such as the arms 24 and 26 are mounted by a mechanism 32 which controls movement of the arms and the associated slider assemblies between loaded and unloaded positions. When the disks 12, 14 and 16 are at rest, the mechanism 32 holds the arm 24 and 26 in unloaded positions so that the associated slider assemblies such as the slider assembly 28 are held well apart from the adjacent surfaces of the disk 12. When the disks 12, 14 and 16 are accelerated to nominal operating speed, the mechanism 32 moves the various arms such as the arms 24 and 26 into loaded positions so that the associated slider assemblies such as the slider assembly 28 are caused to approach the adjacent surfaces of the disks 12, 14 and 16. Rotation of the disks 12, 14 and 16 at the relatively high nominal speed causes air bearings to form between the disk surfaces and the adjacent slider assemblies. As a result the slider assemblies float on such air bearings and avoid contact with the adjacent disk surface as writing and reading operations take place within various data tracks on the surfaces of the disks 12, 14 and 16.

The mechanism 32 may be of the type described in the previously referred to Dalziel application Ser. No. 759,900. As noted, that application describes a mechanism for loading and unloading the slider assemblies through use of a simple mechanical apparatus. The mechanical apparatus engages the arms when desired so as to move the arms into the unloaded positions and at the same time limit their radial movement. Opposite movement of the mechanical apparatus returns the arms to the loaded positions and at the same time enables the arms to undergo radial movement.

The various arms of the magnetic disk drive 10 are of like configuration, and a portion of the arm 24 is shown in FIGS. 2-4. As seen therein the arm 24 is comprised of an elongated load beam 34 of relatively rigid construction having a thin planar central portion 36 thereof extending between opposite side rails 38 and 40 of the load beam 34. The load beam 34 terminates at a free outer end 42 opposite the mechanism 32 shown in FIG. 1. The load beam 34 has an upwardly extending tip portion 44 at the free outer end 42 thereof for holding wire leads (not shown) from the magnetic head slider assembly 28.

Figure 7:
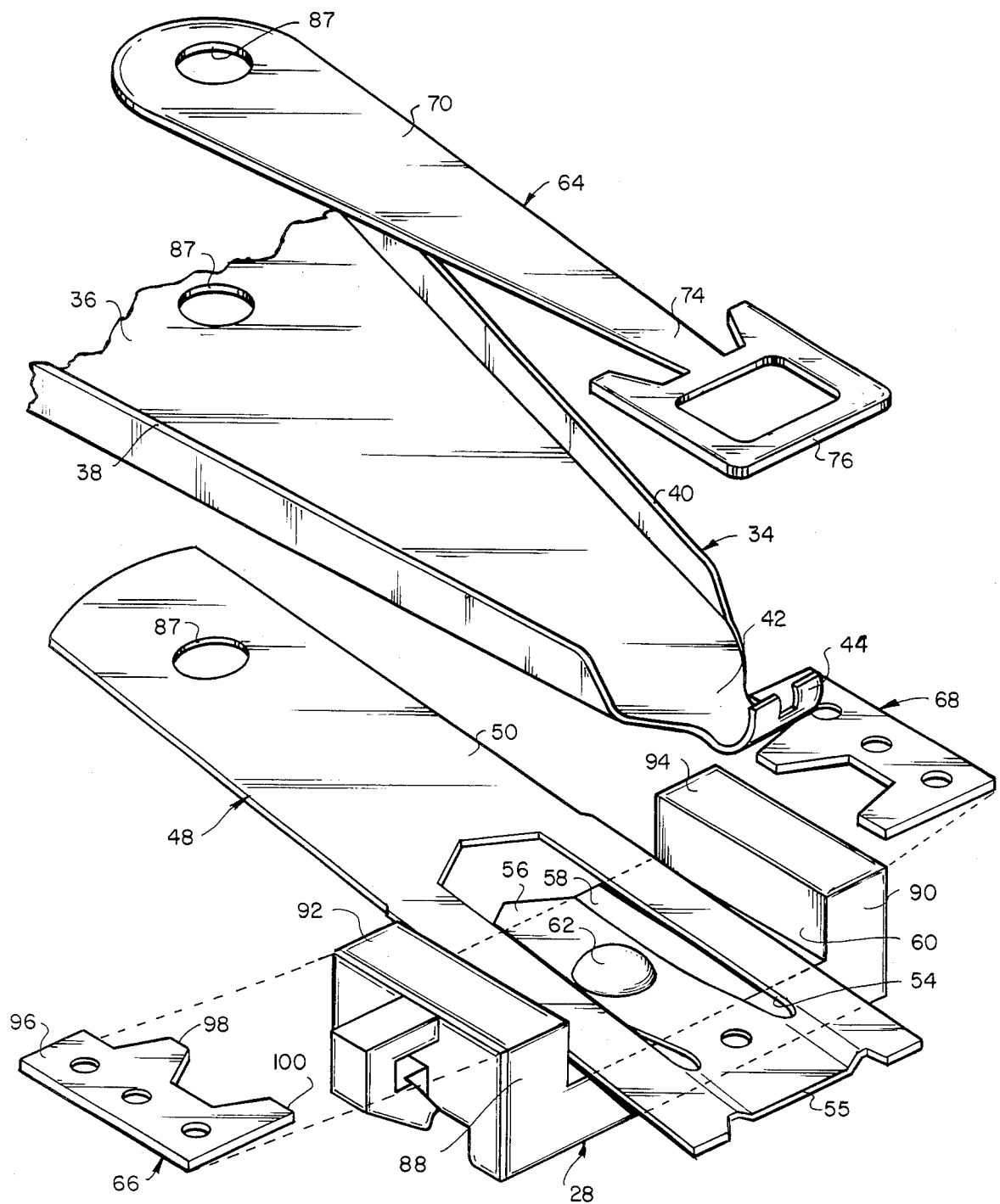
FIG. 7 is a perspective, exploded view of the arm assembly of FIGS. 2-4.

The magnetic head slider assembly 28 is coupled to the free outer end 42 of the load beam 34 by a resilient flexure element 48 which is shown in detail in FIG. 7. The flexure element 48 which is made of resilient, relatively flexible material has a first portion 50 thereof secured to a bottom surface 52 of the load beam 34 defined by the underside of the thin planar central portion 36 of the load beam 34. The flexure element 48 is of elongated configuration and has a cutout portion 54 thereof adjacent an end 55 of the element 48 which defines a second portion 56 of the flexure element 48. The second portion 56 is secured to a top surface 58 of a central portion 60 of the slider assembly 28.

The second portion 56 of the flexure element 48 is bent at the base thereof where it joins the first portion 50 so as to form a relatively small angle therewith. This disposes the second portion 56 relatively close to the first portion 50. The second portion 56 is provided at a central region thereof with an upwardly extending gimballing proturberance 62 which rests against an underside of the free outer end 42 of the load beam 34 when the slider assembly 28 is forced toward the load beam 34 by an air bearing at the surface 30 of the disk 12. The gimballing protuberance 62 which lies along a central axis of the slider assembly 28 provides for the desired gimballing motion of the slider assembly 28 needed to maintain the air bearing between the bottom of the slider assembly 28 and the adjacent disk surface 30. The flexure element 48 is of sufficient flexibility to allow the slider assembly 28 to gimbal about the protuberance 62 in a desired fashion.

When the load beam 34 is placed in the loaded position by the mechanism 32, the creation of an air bearing at the underside of the slider assembly 28 by the rotating disk 12 provides an upward force on the slider assembly 28 maintaining the protuberance 62 in contact with the underside of the free outer end of the load beam 34. The load beam 34 is considerably more rigid than the flexure element 48 and yet is capable of upward flexure as necessary to maintain the air bearing. When the load beam 34 is raised into the unloaded position by the mechanism 32, the flexure element 48 which is highly flexible in nature nevertheless has sufficient resiliency to keep the slider assembly 28 positioned close to the underside of the free outer end 42 of the load beam 34. However, a sudden downward shock load such as from dropping the magnetic disk drive 10 could result in the weight of the slider assembly 28 pulling the attached second portion 56 of the flexure element 48 well away from the first portion 56. This could result in the slider assembly 28 undergoing substantial downward movement or rotational movement or both relative to the free outer end 42 of the load beam 34. Such downward and/or rotational movement of the slider assembly 28 may be sufficient to cause the bottom or corner of the slider assembly 28 to contact the adjacent surface 30 of the disk 12 in spite of relatively little accompanying downward flexure of the load beam 34. Such contact can result in damage of the slider assembly 46 or the surface 30 of the disk 12 or both.

Such damaging contact is prevented by a preferred embodiment of a mechanism in accordance with the invention which includes an elongated support element 64 and a pair of wing elements 66 and 68. The elongated support element 64 has an elongated, thin, planar body portion 70 extending along the load beam 34 in the direction of a longitudinal center axis 72 of the load beam 34. The body portion 70 of the support element 64 has a width which tapers from a maximum at an end 74 thereof to a minimum adjacent an end portion 76 of the support element 64. The body portion 70 is mounted on and extends along a portion of the top surface of the thin planar central portion 36 of the load beam between the opposite side rails 38 and 40 adjacent the free outer end 42 of the load beam 34.

Figure 5:
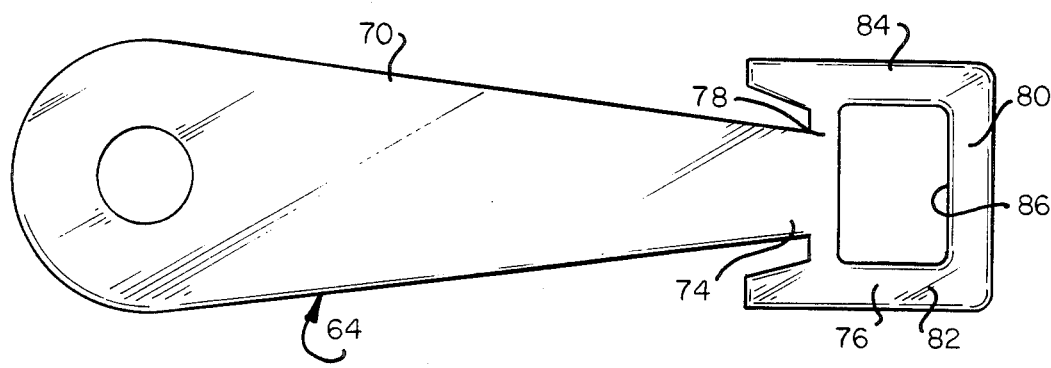
FIG. 5 is a plan view of the elongated support element forming a part of the mechanism for limiting movement of the slider assembly in FIGS. 2-4.

As best seen in FIG. 5 which depicts the support element 64 in detail, the end portion 76 thereof has a first transverse member 78 at the end of the body portion 70 and an opposite second transverse member 80 spaced apart from and generally parallel to the transverse member 78. The transverse members 78 and 80 extend between and join opposite ends of an opposite pair of spaced apart, generally parallel side arms 82 and 84. The space between the opposite transverse members 78 and 80 and between the side arms 82 and 84 defines an aperture 86 within the end portion 76 of the support element 64. With the body portion 70 of the support element 64 mounted on the top surface of the load beam 34 adjacent the free outer end 42 in the manner previously described, the end portion 76 of the support element 64 extends beyond the free outer end 42 of the load beam 34 and the aperture 86 therein receives the upwardly extending tip portion 44 of the load beam 34. This disposes the side arms 82 and 84 on the opposite sides of and generally parallel to the longitudinal center axis 72 of the load beam 34.

The body portion 70 of the elongated support element 63 is provided with an aperture 87 as are the thin planar central portion 36 of the elongated load beam 34 and the first portion 50 of the resilient flexure element 48 as shown in FIG. 7. A rivet 89 disposed within the apertures 87 joins the support element 64, the load beam 34 and the resilient flexure element 48 together as shown in FIG. 8.

As seen in FIG. 4 as well as in FIG. 2, the upper portion of the slider assembly 28 is provided with a pair of raised shoulders 88 and 90 extending upwardly from the top surface 58 of the central portion 60 at opposite sides of the central portion 60. The raised shoulders 88 and 90 are of elongated configuration and have relatively flat upper surfaces 92 and 94 disposed on opposite sides of and generally parallel to the longitudinal center axis 72 of the load beam 34. The wing element 66 is mounted on the upper surface 92 of the raised shoulder 88, while the wing element 68 is mounted on the upper surface 94 of the raised shoulder 90.

Figure 6:
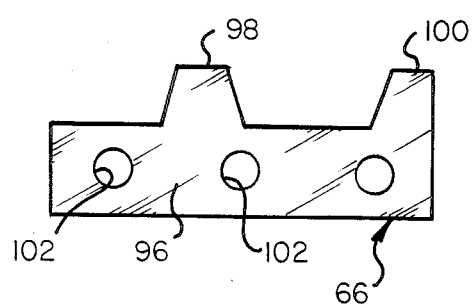
FIG. 6 is a plan view of one of a pair of wing elements comprising further portions of the mechanism for limiting movement of the slider assembly in FIGS. 2-4.

The wing element 66 is shown in detail in FIG. 6. As shown therein the wing element 66 has an elongated body portion 96 thereof having a pair of tabs 98 and 100 extending transversely from the elongated body portion 96 at two different locations along the length thereof. The wing element is provided with three different apertures 102 along the length of the elongated body portion 96 to facilitate mounting of the wing element 66 on the upper surface 92 of the raised shoulder 88 using adhesive bonding. The wing element 68 is of like configuration but of inverted orientation when mounted on the upper surface 94 of the raised shoulder 90.

As best seen in FIGS. 2 and 4 the end portion 76 of the support element 64 is disposed between the wing elements 66 and 68 and the central portion 60 of the slider assembly 28. The tabs 98 and 100 of the wing element 66 are disposed above the opposite ends of the side arm 82. In like fashion the two tabs of the wing element 68 are disposed above the opposite ends of the side arm 84. This is also illustrated in FIG. 9.

It will be appreciated that the mechanism comprised of the support element 64 and the wing elements 66 and 68 limits the downward and rotational movement of the slider assembly 28 relative to the load beam 34. Thus, when the mechanism 32 positions the load beam 34 and the slider assembly 28 in the unloaded position, a sudden shock load such as would result from dropping of the magnetic disk drive 10 would cause a sudden downward movement of the slider assembly 46 relative to the free outer end 42 of the load beam 34 as previously explained. In such a case the wing elements 66 and 68 engage the adjacent side arms 82 and 84 of the end portion 76 of the support element 64 to limit the permissible downward movement of the slider assembly 28 as shown in FIG. 10, thereby preventing damaging contact of the slider assembly 28 with the surface 30 of the rigid disk 12. At the same time the presence of the opposite wing elements 66 and 68 prevents any significant rotational movement of the slider assembly 28.

The mechanism comprised of the support element 64 and the wing elements 66 and 68 does not interfere with operation of the slider assembly 28. When the mechanism 32 positions the load beam 34 and thus the slider assembly 28 in the loaded position such that an air bearing is created at the underside of the slider assembly 28, the upward force on the slider assembly 28 maintains the gimballing protuberance 62 in contact with the underside of the free outer end 42 of the load beam 34. The slider assembly 46 undergoes gimballing motion in the desired manner. All the while the wing elements 66 and 68 remain far enough above the end portion 76 of the support element 64 so that the desired gimballing action is not in any way interfered with. The resulting gaps 106 and 108 between the wing elements 66 and 68 and the end portion 76 of the support element 64 are shown in FIG. 9.

In the preferred embodiment of FIGS. 2-10 potentially damaging movement of the slider assembly 28 in response to shock loads is prevented by the elongated support element 64 in combination with the wing elements 66 and 68. The presence of the two wing elements 66 and 68, each being mounted on one of the opposite sides of the slider assembly 28, limits the possible rotational movement of the slider assembly 28 relative to the load beam 34 as well as the possible downward movement of the slider assembly 28 relative to the load beam 34. If the slider assembly 28 begins to rotate or twist in a clockwise direction as viewed in FIG. 9 in response to a shock load, the wing element 68 engages the end portion 76 of the elongated support element 64 to limit the rotational movement of the slider assembly 28. Conversely, if the slider assembly 28 rotates or twists in a counterclockwise direction as viewed in FIG. 9 in response to a shock load, the wing element 66 quickly engages the end portion 76 of the elongated support element 64 to limit such rotational movement. While the greatest threat of damage in response to shock loads is posed by straight downward movement of the slider assembly 28 with eventual contacting of the disk surface thereby, the limitation of rotational motion provided by the presence of the two wing elements 66 and 68 is a desirable feature. This is particularly true in those situations where the total downward movement of the slider assembly 28 is relatively small but twisting motion of the slider assembly 28 relative to the load beam 34 would otherwise be sufficient to produce contact of an edge portion of the slider assembly 28 with the disk surface in the absence of the wing elements 66 and 68 and the support element 64.

Figure 11:
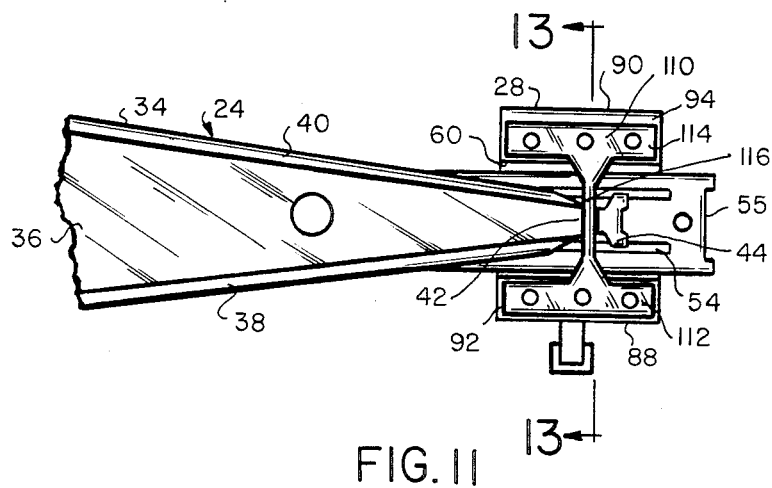
FIG. 11 is a top view of a portion of an arm assembly including a first alternative embodiment of a mechanism for limiting movement of the slider assembly.
Figure 12:
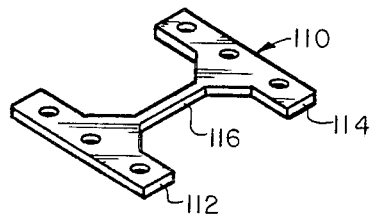
FIG. 12 is a perspective view of the limit element of the mechanism for limiting movement of the slider assembly in FIG. 11.
Figure 13:
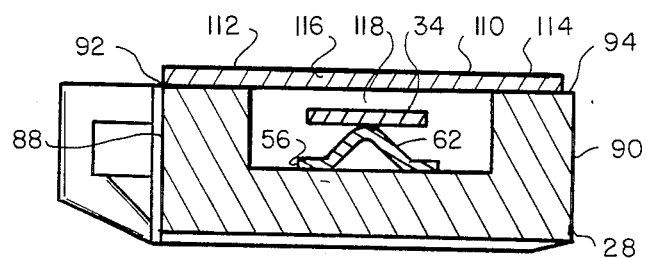
FIG. 13 is a sectional view of the arm assembly of FIG. 11 taken along the line 13—13 of FIG. 11 and illustrating the condition with a sudden downward shock load applied.

A first alternative embodiment of an arrangement for limiting movement of the slider assembly 28 relative to the load beam 34 is shown in FIGS. 11-13. Instead of using the support element 64 and the wing elements 66 and 68 in the preferred embodiment of FIGS. 2-10, the embodiment of FIGS. 11-13 utilizes a single limit element 110. The limit element 110, which is generally H-shaped and of relatively thin, generally planar configuration as shown in FIG. 12, is comprised of an opposite pair of elongated body portions 112 and 114 joined at central portions thereof by a bridging portion 116. The elongated body portions 112 and 114 are mounted on the upper surfaces 92 and 94 of the raised shoulders 88 and 90 respectively of the slider assembly 28 by gluing or other appropriate fastening technique.

As shown in FIGS. 11 and 13 the bridging portion 116 of the limit element 110 is disposed immediately above the free outer end 42 of the load beam 34. A gap 118 normally exists between the bridging portion 116 and the load beam 34 so that the limit element 110 does not interfere with the normal gimballing motion of the slider assembly 28. However, in the event of a shock load, the bridging portion 116 engages the free outer end 42 of the load beam 34 after movement through the gap 118 to prevent further downward movement of the slider assembly 28.

The limit element 110 cooperates with the outer end 42 of the load beam 34 to prevent a certain amount of rotational motion of the slider assembly 28 relative to the load beam 34. However, because of the relatively narrow width of the load beam 34 in the region of the bridging portion 116 of the limit element 110, the arrangement of FIGS. 11-13 is not as effective in limiting rotation of the slider assembly 28 as is the arrangement of FIGS. 2-10. Moreover, the arrangement of FIGS. 11-13 does not always readily lend itself to installation on slider assemblies of standard configuration, and can result in some stressing of the slider assembly due to differential thermal expansion between the limit element 110 and the slider assembly 28. However, the arrangement of FIGS. 11-13 is simpler and less expensive than the arrangement of FIGS. 2-10. In the arrangement of FIGS. 11-13, only the single limit element 110 need be installed as opposed to the separate support element 64 and the wing elements 66 and 68 of the arrangement of FIGS. 2-10.

Figure 14:
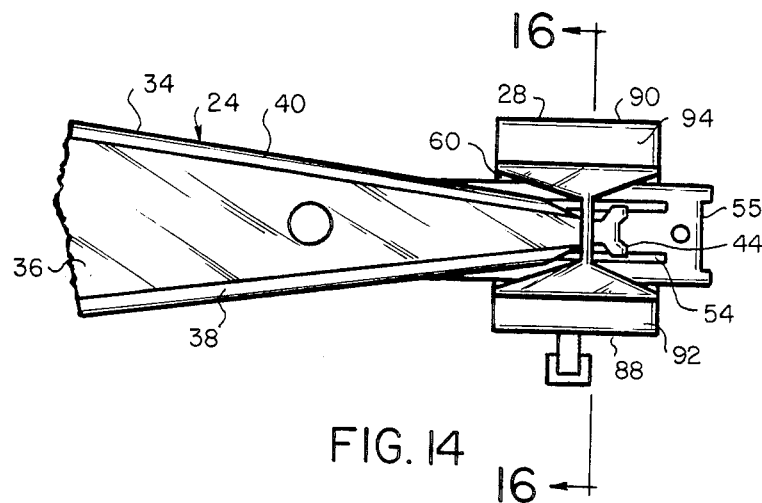
FIG. 14 is a top view of a portion of an arm assembly including a second alternative embodiment of a mechanism for limiting movement of the slider assembly.
Figure 15:
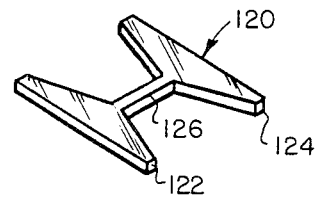
FIG. 15 is a perspective view of the limit element of the mechanism for limiting movement of the slider assembly in FIG. 14.
Figure 16:
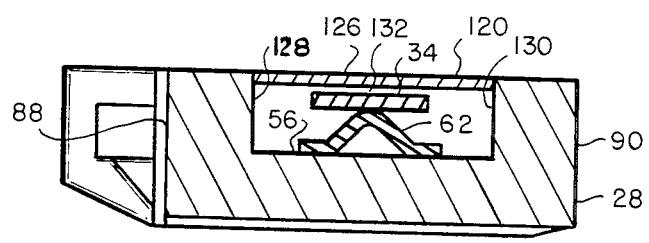
FIG. 16 is a sectional view of the arm assembly of FIG. 14 taken along the line 16—16 of FIG. 14 and illustrating the condition with a sudden downward shock load applied.

A second alternative embodiment of an arrangement for limiting the movement of the slider assembly 28 relative to the load beam 34 is shown in FIGS. 14-16. As in the arrangement of FIGS. 11-13, the arrangement of FIGS. 14-16 utilizes a single H-shaped limit element 120 of relatively thin, generally planar configuration and comprised of opposite elongated body portions 122 and 124 joined at their central regions by a bridging portion 126. Unlike the limit element 110 of the arrangement of FIGS. 11-13 in which the elongated body portions 112 and 114 are mounted on the upper surfaces 92 and 94 of the raised shoulders 88 and 90, in the arrangement of FIGS. 14-16 the elongated body portions 122 and 124 are joined to inner walls 128 and 130 of the raised shoulders 88 and 90 respectively. This has the advantage that the location of the limit element 120 above the surface 58 of the central portion 60 of the slider assembly 28 can be selected to produce a gap 132 of desired size between the limit element 120 and the load beam 34. With the arrangement of FIGS. 11-13, no such adjustment is possible because the vertical location of the limit element 110 is determined by the tops of the raised shoulders 88 and 90. Depending upon the nominal position of the load beam 34 within the central portion 60 of the slider assembly 28, this may result in the gap 118 being either too large in which event the permissible downward movement of the slider assembly 28 may be dangerously large or too small in which event normal gimballing motion of the slider assembly 28 may be interfered with. In the arrangement of FIGS. 14-16, the limit element 120 is fastened to the inner walls 128 and 130 of the raised shoulders 88 and 90 at a location which provides the gap 132 of desired size.

As in the case of the arrangement of FIGS. 11-13, the arrangement of FIGS. 14-16 is limited in the amount of rotational motion of the slider assembly 28 that is prevented, may not be suitable for use with all slider assemblies and may result in some thermal stressing of the slider assembly. On the other hand the single limit element 120 is inexpensive and easy to install.

While the invention has been particularly shown and described with reference to a preferred embodiment thereof, it will be understood by those skilled in the art that various changes in form and details may be made therein without departing from the spirit and scope of the invention.

What is claimed is:

1. An arm assembly for use with a rigid magnetic disk in a magnetic disk drive comprising the combination of:
   an elongated load beam having a free end;
   a resilient flexure element having a first portion thereof coupled to the load beam at the free end and a second portion thereof normally spaced apart from and having a gimballing protuberance disposed adjacent the free end of the load beam;
   a magnetic head slider assembly coupled to the second portion of the flexure element, the magnetic head slider assembly having a pair of shoulders disposed on opposite sides of and forming a recess therebetween adjacent a central portion of the slider assembly and each of the shoulders having a relatively flat surface disposed on an opposite side of the recess from the central portion and within a common plane, the free end of the load beam being disposed within the recess; and
   a relatively thin, generally planar limit element, the limit element being disposed within the common plane and having an opposite pair of elongated body portions, each mounted on the surface of a different one of the pair of shoulders, and a bridging portion extending between central portions of the opposite pair of elongated body portions and disposed on the opposite side of the free end of the load beam from the slider assembly, the limit element being operative to prevent the slider assembly from contacting an adjacent rigid magnetic disk when the elongated load beam is moved into an unloaded position away from the rigid magnetic disk and the magnetic disk drive is subjected to shock loads.

2. An arm assembly for use with a rigid magnetic disk in a magnetic disk drive comprising the combination of:
   an elongated load beam having a free end;
   a resilient flexure element having a first portion thereof coupled to the load beam at the free end and a second portion thereof normally spaced apart from and having a gimballing protuberance disposed adjacent the free end of the load beam;
   a magnetic head slider assembly coupled to the second portion of the flexure element, the magnetic head slider assembly having a pair of shoulders disposed on opposite sides of and forming a recess therebetween adjacent a central portion of the slider assembly and each of the shoulders having an inner wall forming one of a pair of opposite sides of the recess, the free end of the load beam being disposed within the recess; and
   a relatively thin, generally planar limit element, the limit element having an opposite pair of elongated body portions, each fastened to the inner wall of a different one of the pair of shoulders and a bridging portion extending between central portions of the opposite pair of elongated body portions and disposed on the opposite side of the free end of the load beam from the central portion of the slider assembly, the limit element being operative to prevent the slider assembly from contacting an adjacent rigid magnetic disk when the elongated load beam is moved into an unloaded position away from the rigid magnetic disk and the magnetic disk drive is subjected to shock loads.

3. An arm assembly for use with a rigid magnetic disk in a magnetic disk drive comprising the combination of:
   an elongated load beam having a free end;
   a resilient flexure element having a first portion thereof coupled to the load beam at the free end and a second portion thereof normally spaced apart from and having a gimballing protuberance disposed adjacent the free end of the load beam;
   a magnetic head slider assembly coupled to the second portion of the flexure element, the magnetic head slider assembly having a pair of raised shoulders disposed on opposite sides of a central portion of the slider assembly;
   an elongated support element mounted on the load beam and having an opposite pair of side arms disposed adjacent the pair of raised shoulders of the slider assembly; and
   a pair of wing elements, each mounted on a different one of the pair of raised shoulders of the slider assembly and disposed on an opposite side of an adjacent one of the pair of side arms of the support element from the central portion of the slider assembly, the pair of wing elements being operative to engage the pair of side arms of the support element to prevent the magnetic head slider assembly from contacting an adjacent rigid magnetic disk in response to shock loads when the load beam is in an unloaded position relative to the adjacent rigid magnetic disk;
   the support element having an elongated body portion generally coextensive with an adjacent portion of the load beam and an end portion extending beyond the free end of the load beam, the end portion including the opposite pair of side arms which extend generally in the direction of elongation of the elongated body portion and an opposite pair of transverse members extending between the ends of the side arms.

4. An arm assembly for use with a rigid magnetic disk in a magnetic disk drive comprising the combination of:
   an elongated load beam having a free end;
   a resilient flexure element having a first portion thereof coupled to the load beam at the free end and a second portion thereof normally spaced apart from and having a gimballing protuberance disposed adjacent the free end of the load beam;
   a magnetic head slider assembly coupled to the second portion of the flexure element, the magnetic head slider assembly having a pair of raised shoulders disposed on opposite sides of a central portion of the slider assembly;
   an elongated support element mounted on the load beam and having an opposite pair of side arms disposed adjacent the pair of raised shoulders of the slider assembly; and
   a pair of wing elements, each mounted on a different one of the pair of raised shoulders of the slider assembly and disposed on an opposite side of an adjacent one of the pair of side arms of the support element from the central portion of the slider assembly, the pair of wing elements being operative to engage the pair of side arms of the support element to prevent the magnetic head slider assembly from contacting an adjacent rigid magnetic disk in response to shock loads when the load beam is in an unloaded position relative to the adjacent rigid magnetic disk;
   the load beam having a thin planar central portion thereof at the free end, the flexure element comprising an elongated element of resilient material having a cutout portion thereof separating the first portion thereof from the second portion thereof, the first portion being of thin planar configuration and being joined to a bottom surface of the central portion of the load beam along a substantial portion of the length of the first portion and normally having a relatively straight configuration along the length of the first portion, the second portion of the flexure element being of thin planar configuration except for the gimballing protuberance and being joined to a top surface of the central portion of the slider assembly between the pair of raised shoulders, and the support element having a thin planar body portion joined to a top surface of the central portion of the load beam opposite the bottom surface and an end portion extending beyond the free end of the load beam and including the opposite pair of side arms.

5. The invention set forth in claim 4, wherein the end portion of the support element has an aperture therein between the opposite pair of side arms, and the load beam has an upwardly extending tip portion at the end of the central portion, the tip portion extending through the aperture in the end portion of the support element.

6. In a magnetic disk drive having at least one arm assembly of elongated configuration which is selectively pivotable between position adjacent and spaced apart from a rigid magnetic disk depending upon the state of operation of the disk drive, an arrangement for mounting a magnetic head slider assembly on a free outer end of the arm assembly to provide a gimballed suspension of the slider assembly and at the same time limit movement of the slider assembly relative to the free outer end of the arm assembly to prevent damaging contacting of the magnetic disk by the slider assembly in response to shock loads to the disk drive with the arm assembly pivoted to the position spaced apart from the magnetic disk, said arrangement comprising a gimballed mount coupling the slider assembly to the free outer end of the arm assembly and at least one limit element mounted on the slider assembly for engaging a portion of the arm assembly, the gimballed mount normally assuming a relatively straight configuration but flexing into a configuration of substantial curvature in response to shock loads to the disk drive, the limit element normally being free of the arm assembly when the arm assembly is pivoted to the position spaced apart from the magnetic disk and being operative to engage a portion of the arm assembly after the slider assembly has undergone an allowable amount of movement relative to the free outer end of the arm assembly in response to a shock load to the disk drive to prevent further movement of the slider assembly relative to the free outer end of the arm assembly.

7. The invention set forth in claim 6, wherein the arm assembly includes an arm of elongated configuration having a free outer end and a support element mounted on the arm and extending beyond the free outer end of the arm to a location adjacent the slider assembly, and wherein the gimballed mount comprises a flexure member of elongated configuration having a cutout portion dividing the flexure member into first and second portions, the first portion being mounted on the free outer end of the arm and normally assuming a relatively straight configuration and the second portion being mounted on the slider assembly and having a gimballed protuberance extending toward the free outer end of the arm, and the at least one limit element comprises a pair of limit elements mounted on opposite sides of the slider assembly from a central region of the slider assembly, the pair of limit elements being disposed on an opposite side of the support element from the central region of the slider assembly and being engaged by the support element after the slider assembly has undergone an allowable amount of movement relative to the free outer end of the arm in response to a shock load to the disk drive.

8. The invention set forth in claim 6, wherein the limit element is disposed adjacent the free outer end of the arm and is engaged by the free outer end of the arm after the slider assembly has undergone an allowable amount of movement relative to the free outer end of the arm in response to a shock load to the disk drive.

9. An arm assembly for use with a rigid magnetic disk in a magnetic disk drive comprising:
   an elongated arm having a free outer end, the free outer end having an underside thereof;
   a head slider assembly;
   a flexible element coupling the slider assembly to the underside of the free outer end of the elongated arm; and
   means for limiting movement of the slider assembly in a direction away from the free outer end of the elongated arm to prevent the slider assembly from contacting an adjacent rigid magnetic disk in response to shock loads when the elongated arm is in an unloaded position relative to the adjacent rigid magnetic disk, said means including a support element mounted on the arm and extending beyond the free outer end of the arm and at least one restraining element mounted on the slider assembly and disposed above the portion of the support element extending beyond the free outer end of the arm.

10. The invention set forth in claim 9, wherein the at least one restraining element comprises a pair of wing elements mounted on opposite portions of the slider assembly and disposed adjacent a portion of the support element extending beyond the free outer end of the arm.

11. A motion restriction arrangement for use with a magnetic disk drive in which a magnetic head slider assembly is movably coupled to the outer free end of an arm which is movable into a position spaced-apart from the surface of a rigid magnetic disk, the motion restriction arrangement being operative to prevent the magnetic head slider assembly from contacting the surface of the rigid magnetic disk when the arm is moved into a position spaced-apart from the surface of the magnetic disk and the magnetic disk drive is subjected to shock loads and comprising an elongated support element mounted on the arm and having an end portion thereof including a pair of opposite arms extending beyond the outer free end of the arm and a pair of wing elements mounted on the opposite portions of the slider assembly and disposed on the opposite sides of the pair of arms from a central portion of the slider assembly between the opposite portions.

12. The invention set forth in claim 11, wherein the support element has an elongated body portion joined to the end portion and having a longitudinal center axis and a width which tapers from a maximum at an end of the body portion opposite the end portion to a minimum where the body portion joins the end portion, the end portion including a pair of elongated transverse portions intersecting and extending transversely to the longitudinal center axis of the body portion with one of the pair of transverse portions being coupled to the body portion and the other of the pair of transverse portions being spaced apart therefrom, the pair of arms being disposed on opposite sides of and generally parallel to the longitudinal center axis and each extending between and being coupled to ends of the elongated transverse portions.

13. The invention set forth in claim 12, wherein each of the pair of wing elements has an elongated body portion disposed generally parallel to the longitudinal center axis of the body portion of the support element and a pair of tabs extending transversely from the elongated body portion to regions above the opposite ends of one of the pair of arms.

14. An arm assembly for use with a rigid magnetic disk in a magnetic disk drive comprising:
   an elongated arm assembly having a free outer end, the free outer end having a side thereof;
   a head slider assembly;
   a flexible element coupling the slider assembly to the side of the free outer end of the elongated arm assembly; and
   means for limiting movement of the slider assembly in a direction away from the free outer end of the elongated arm assembly to prevent the slider assembly from contacting an adjacent rigid magnetic disk when the elongated arm assembly is moved into an unloaded position away from the rigid magnetic disk and the magnetic disk drive is subjected to shock loads, said means including a limit element mounted on the slider assembly and disposed adjacent the free outer end of the elongated arm assembly, the limit element normally being spaced apart from the elongated arm assembly when the elongated arm assembly is moved into the unloaded position away from the rigid magnetic disk and being operative to engage the elongated arm assembly to prevent the slider assembly from contacting an adjacent rigid magnetic disk when the magnetic disk drive is subjected to shock loads.

15. The invention set forth in claim 14, wherein the head slider assembly has a pair of shoulders disposed on opposite sides of and defining a recess therebetween adjacent a central portion of the slider assembly, the flexible element is coupled to the central portion of the slider assembly, the limit element extends between the pair of shoulders on an opposite side of the recess from the central portion, and the free outer end of the elongated arm assembly is disposed within the recess between the central portion of the slider assembly and the limit element.

16. The invention set forth in claim 15, wherein the pair of shoulders have surfaces spaced from the central portion of the slider assembly to engage the elongated arm assembly to prevent the slider assembly from contacting an adjacent rigid magnetic disk when the magnetic disk drive is subjected to shock loads and the limit element is mounted on the surfaces of the pair of shoulders.

17. The invention set forth in claim 15, wherein the pair of shoulders have inner walls at opposite sides of the recess at the central portion and the limit element is fastened to each of the inner walls of the pair of shoulders.

* * * * *